United States Patent [19]

Kawata et al.

[11] Patent Number: 4,756,561
[45] Date of Patent: Jul. 12, 1988

[54] SEALING GASKET

[75] Inventors: Masayuki Kawata, Higashi-Hiroshima; Kouji Takatou, Hiroshima, both of Japan

[73] Assignee: Mazda Motor Corporation, Hiroshima, Japan

[21] Appl. No.: 827,454

[22] Filed: Feb. 10, 1986

[30] Foreign Application Priority Data

Feb. 14, 1985 [JP] Japan .................................. 60-28005
Apr. 10, 1985 [JP] Japan .................................. 60-54044[U]

[51] Int. Cl.⁴ .............................................. F16L 55/00
[52] U.S. Cl. ..................................... 285/187; 285/363; 285/910; 277/235 B; 277/DIG. 6
[58] Field of Search .................. 285/910, 187; 277/26, 277/DIG. 6, 180, 234, 227, 235 B

[56] References Cited

U.S. PATENT DOCUMENTS

| 1,985,473 | 12/1934 | Victor | 277/235 B |
| 2,055,471 | 9/1936 | Balfe | 277/DIG. 6 |
| 4,271,228 | 6/1981 | Foster et al. | 277/235 B X |
| 4,477,094 | 10/1984 | Yamamoto | 277/235 B |
| 4,519,619 | 5/1985 | Doyle | 277/DIG. 6 |
| 4,581,882 | 4/1986 | Pollo et al. | 277/DIG. 6 X |

FOREIGN PATENT DOCUMENTS

| 50-83415 | 7/1975 | Japan . | |
| 54-107725 | 7/1979 | Japan . | |
| 86224 | 7/1981 | Japan | 277/235 B |
| 56-149015 | 11/1981 | Japan . | |
| 57-136818 | 8/1982 | Japan . | |

Primary Examiner—Dave W. Arola
Attorney, Agent, or Firm—Fleit, Jacobson, Cohn & Price

[57] ABSTRACT

A gasket for use in an engine exhaust system. The gasket includes a layer of ceramic fibers with particles of mica or vermiculite dispersed in the ceramic fibers. The mica or the vermiculite expands when it is heated and then the free dimension is increased after the heat is relieved so that the gasket thickness is increased after the first cycle of the heating and cooling. Thus, a positive gas sealing can be ensured even if thermal deformations are formed in the connecting flanges in the exhaust system.

14 Claims, 5 Drawing Sheets

SEALING GASKET

BACKGROUND OF THE INVENTION

1. Field of the Invention

The present invention relates to a sealing gasket, and more particularly to a sealing gasket for an application wherein the gasket is subjected to a high temperature.

2. Description of the Prior Art

Sealing gaskets used in high temperature systems generally include a sheet of heat-resistant material such as asbestos sheet which is held between a pair of plates of a relatively soft material such as copper. As disclosed in FIG. 2 of Japanese utility model application No. 48-127591 filed on Nov. 2, 1973 and disclosed for public inspection on July 17, 1975 under the disclosure No. 50-83415, such gasket has been used as an example in an automobile engine exhaust system. The exhaust system includes an exhaust pipe assembly wherein two pipe elements are connected together by means of connecting flanges with the gasket held between the connecting flanges. In this type of arrangement, the exhaust pipe assembly is subjected to a high temperature in operation of the engine so that thermal deformations are produced in connecting flanges. Such deformations in the connecting flanges cause a decrease or uneven distribution in pressure applied by the flanges to the gasket possibily resulting in gas leakage. Another problem in the conventional sealing gasket is that it is shrunk in thickness through a prolonged use so that the sealing property is weakened.

SUMMARY OF THE INVENTION

It is therefore an object of the present invention to provide a sealing gasket which can afford a satisfactorily high sealing property even after it is subjected to a high temperature.

Another object of the present invention is to provide a sealing gasket which does not loose the sealing power even when thermal deformations are produced in the surface with which the gasket is held in contact.

A further object of the present invention is to provide a sealing gasket of which thickness is increased than the initial one when it is subjected to an operating temperature and then cooled down.

According to the present invention, the above and other objects can be accomplished by a gasket including a pair of thin sheets and an intermediate layer of an yieldable property located between said thin sheets, said layer containing a thermally expandable material which expands upon application of heat from an initial dimension and shrinks when the heat is relieved to a second dimension which is greater than the initial dimension.

In one aspect of the present invention, there is provided an engine exhaust system including a first exhaust passage defining member defining a first exhaust passage and formed at an end of said first exhaust passage with a first mating surface, a second exhaust passage defining member defining a second exhaust passage and formed at an end of said second exhaust passage with a second mating surface, fastening means for securing said first and second exhaust passage defining members with said first and second mating surfaces opposed to each other with sealing gasket means interposed therebetween, said gasket means including a pair of thin sheets placed in contact with said mating surfaces, respectively, and an intermediate layer of a yieldable property located between said thin sheets, said intermediate layer containing a thermally expandable material which expands upon application of heat from an initial dimension and shrinks when the heat is relieved to a second dimension which is greater than the initial dimension.

In another aspect of the present invention, there is provided a fluid system including connecting means between a first member defining a first fluid passage and a second member defining a second fluid passage, said first member having a first mating surface formed around an end of said first fluid passage, said second member having a second mating surface formed around an end of said second fluid passage, fastening means for fastening said first and second members with said first and second mating surfaces opposed with each other with gasket means interposed between said first and second mating surfaces so that said first and second fluid passages are connected with each other, said gasket means including a pair of thin sheets placed in contact with said mating surfaces, respectively, and an intermediate layer of a yieldable property located between said thin sheets, said intermediate layer containing a thermally expandable material which expands upon application of heat from an initial dimension and shrinks when the heat is relieved to a second dimension which is greater than the initial dimension.

The thermally expandable material may be mica or vermiculite containing mica and may be dispersed in a sheet of heat-resistant fibers.

The above and other objects and features of the present invention will become apparent from the following descriptions of preferred embodiments taking reference to the accompanying drawings.

DESCRIPTION OF THE PREFERRED EMBODIMENTS

Figure 1:
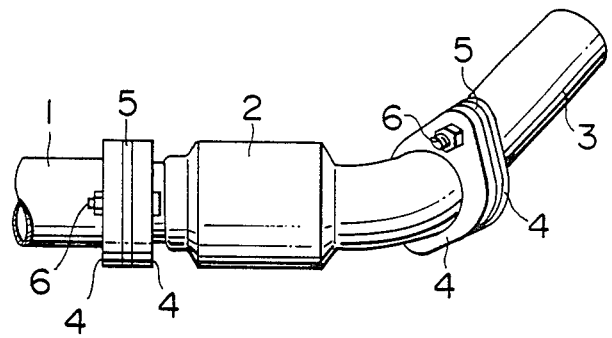
FIG. 1 is a fragmentary perspective view of an engine exhaust system in which the present invention can be embodied.

Referring to the drawings, particularly to FIG. 1, there is shown an engine exhaust system including an exhaust manifold 1 which is adapted to be connected with engine exhaust ports (not shown). A catalytic converter assembly 2 is connected at one end with the exhaust manifold 1, the other end of the converter assembly 2 being connected with a tail pipe 3. The exhaust manifold 1 and the converter assembly 2 are formed with connecting flanges 4 which are connected together by means of bolts 6 with a gasket 5 interposed between the flanges 4. Similarly, the converter assembly 2 and the tail pipe 3 are formed with connecting flanges 4 which are connected together by means of bolts 6 with a gasket 5 interposed between the flanges 4.

Figure 2:
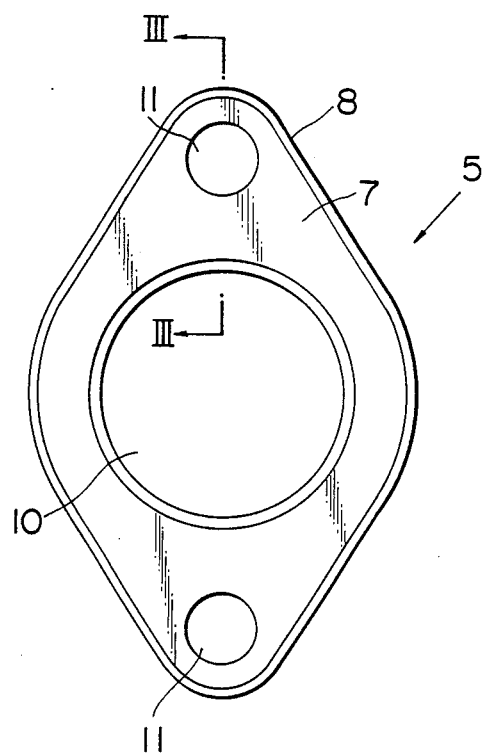
FIG. 2 is a front view of a gasket in accordance with one embodiment of the present invention.
Figure 3:
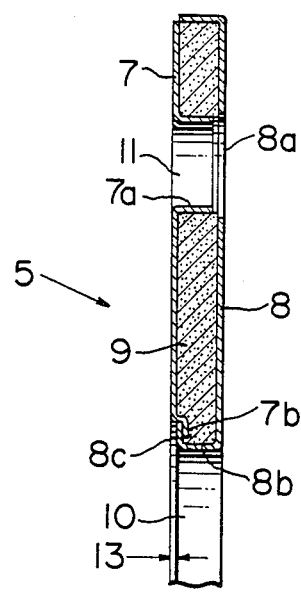
FIG. 3 is a sectional view taken along the line III—III in FIG. 2.
Figure 4:
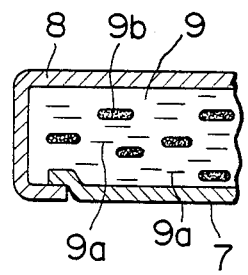
FIG. 4 is a sectional view showing the details of the intermediate layer of the gasket.

Referring now to FIGS. 2 and 3, the gasket 5 is comprised of a pair of thin metal sheets 7 and 8 which are adapted to be placed in contact with the opposed flanges 4. Between the metal sheets 7 and 8, there is an intermediate layer 9 which is made of ceramic fibers 9a and particles 9b of thermally expandable material dispersed in the ceramic fibers as shown in FIG. 4. The gasket 5 is formed at the center thereof with a gas passage aperture 10 and at the opposite side portions with the bolt holds 11. Referring to FIG. 3, it will be noted that the bolt hole 11 is formed by providing a cylindrical portion 7a in the metal sheet 7. The metal sheet 8 is formed with a hold 8a at a portion corresponding to the cylindrical portion 7a in the metal sheet 7. In FIG. 3, it will further be noted that the metal sheet 8 is formed with a cylindrical portion 8b defining the gas passage aperture 10. The cylindrical portion 8b is formed at the end with an outwardly bent flange 8c which is laid over a stepped portion 7b formed in the metal sheet 7. The stepped portion 7b is formed so that the outer surface of the flange 8c is offset axially inward with respect to the outer surface of the metal sheet 7 by a distance 13.

As already described, the gasket 5 is placed between the flanges 4 and the connecting bolts 6 are inserted through the bolt holes 11. The fastening pressure applied by the bolts 6 to the gasket 5 functions compressively deform the intermediate layer 9 in the gasket 5.

Figure 5:
FIG. 5 is a view showing the behavior of the thermally expandable particle.
Figure 6:
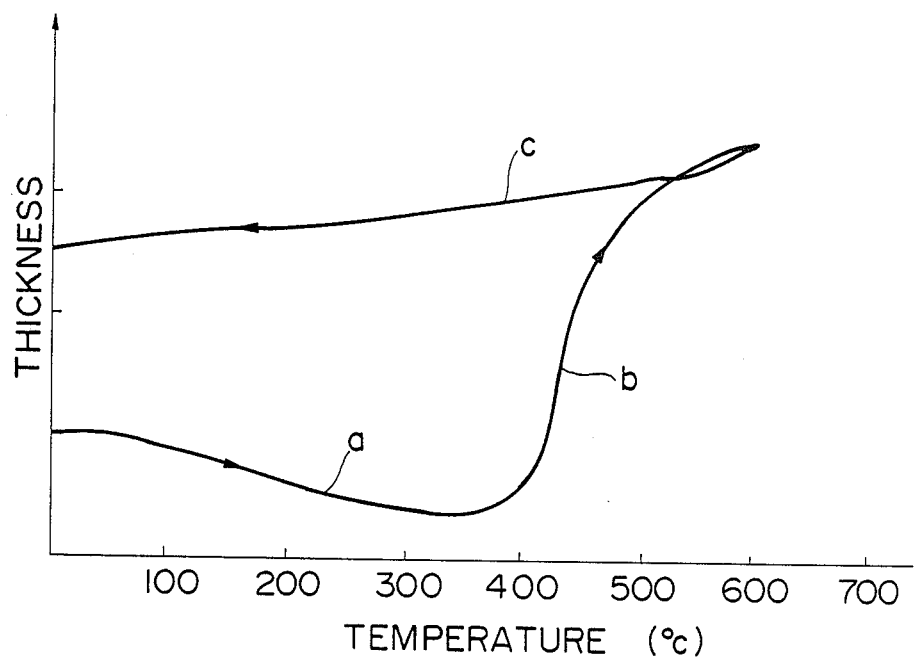
FIG. 6 is a diagram showing the thickness change in the gasket.

In operation of the engine, the heat of the exhaust gas causes a temperature rise in the exhaust system. The gasket 5 is therefore heated and thermal expansion is produced in the thermally expandable particles 9b. The particles may be made of mica or vermiculite which expand under heat in the thicknesswise direction as shown by chain lines in FIG. 5. After heat is relieved, the particle 9b shrinks only partly to the position shown by dotted lines so that the thickness of the particle 9b is increased as compared with the original thickness. Due to this property of the thermally expandable particles 9b, the free thickness of the intermediate layer 9 is increased when it is heated and then cooled down. FIG. 6 shows the change in the thickness of the intermediate layer 9. As the gasket 5 is heated, the thickness at first decreases as shown by a line a in FIG. 6. This is because the binder material contained in the layer 9 is dissipated under heat. As the heating proceeds, the thickness increases rapidly as shown by a line b because the particles 9b start to expand. When the heat is relieved and the gasket 5 is cooled down, the thickness gradually decreases as shown by a line c to a value which is larger than the initial value. Thereafter, the thickness changes along the line c in heating and cooling cycles. It will therefore be understood that the depressing pressure applied to the gasket 5 is increased so that it is possible to ensure a positive gas sealing even if thermal deformations are formed in the connecting flanges 4.

Figure 7:
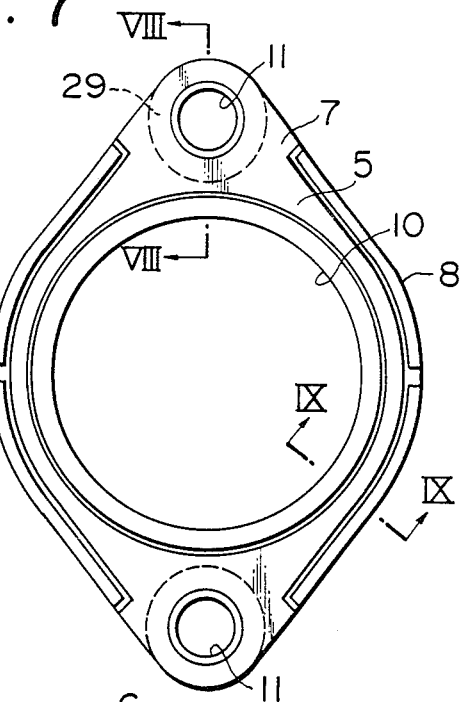
FIG. 7 is a view similar to FIG. 2 but showing another embodiment of the present invention.
Figure 8:
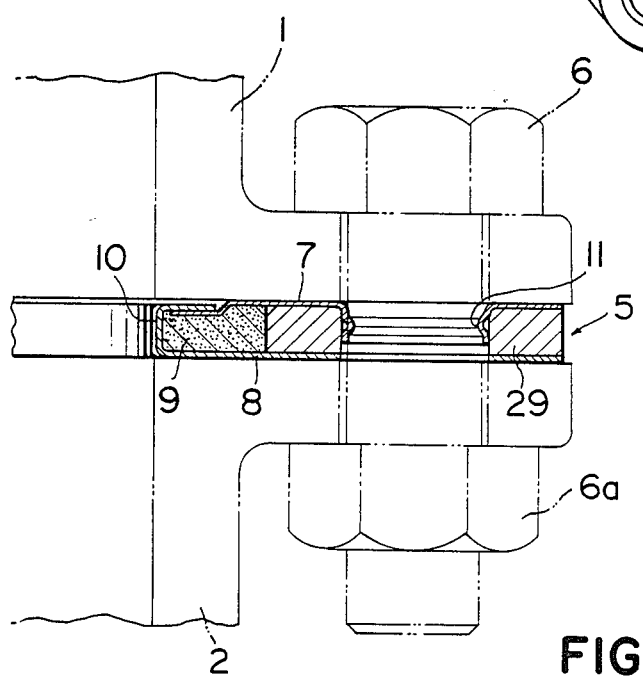
FIG. 8 is a sectional view taken along the line VIII—VIII in FIG. 7.
Figure 9:
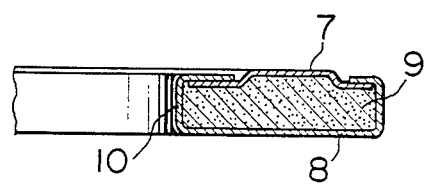
FIG. 9 is a sectional view taken along the line IX—IX in FIG. 4.

Referring to FIGS. 7 through 9, there is shown a second embodiment of the present invention. In this embodiment, the gasket 5 is provided at portions where the bolt holes 11 are formed with insert members 29 which is of an annular configuration and may be made of a hard metallic material. The insert members 29 are adapted to receive bolt tightening force so that it becomes possible to tighten the bolts with a substantially stable tightening torque without applying excessive tightening pressure on the intermediate layer 9.

Figure 10:
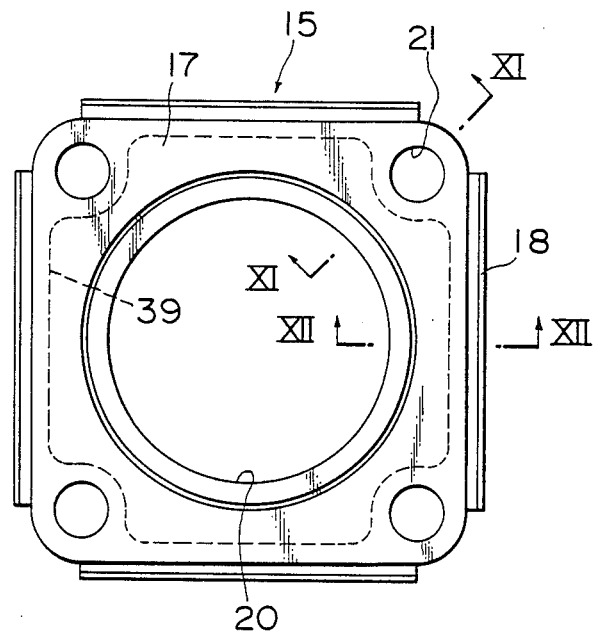
FIG. 10 is a front view of a gasket in accordance with a further embodiment of the present invention.
Figure 11:
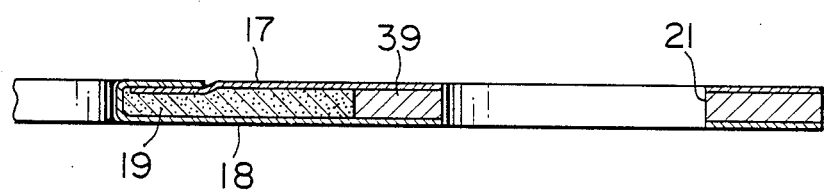
FIG. 11 is a sectional view taken along the line XI—XI in FIG. 10.
Figure 12:
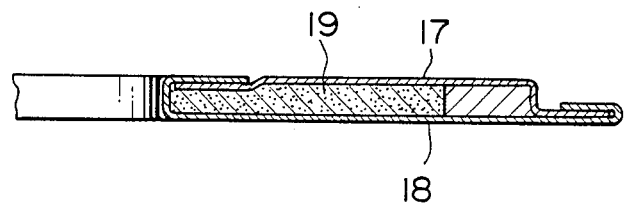
FIG. 12 is a sectional view taken along the line XII—XII in FIG. 10.

Referring to FIGS. 10 through 12, there is shown a further embodiment wherein the gasket 15 is of a square configuration. The gasket 15 is comprised of a pair of thin metal sheets 17 and 18 and an intermediate layer 19 interposed between the metal sheets 17 and 18. The intermediate layer 19 has a structure similar to that of the intermediate layer 9 in the previous embodiments. The gasket 15 is formed with a central gas passage hole 20 and four bolt holes 21 located at corner portions of the square of the gasket 15. Along the periphery of the gasket 15, there is provided a peripheral core 39 which is made of a hard metallic material and the aforementioned bolt holes 21 are formed through the core 39. The core 39 functions as the inserts 29 in the previous embodiments do.

The invention has thus been shown and described with reference to specific embodiments, however, it should be noted that the invention is in no way limited to the details of the illustrated structures but changes and modifications may be made without departing from the scope of the appended claims.

What is claimed is:

1. An engine exhaust system comprising a first exhaust passage member defining a first exhaust passage and formed at an end of said first exhaust passage with a first mating surface, a second exhaust passage defining member defining a second exhaust passage and formed at an end of said second exhaust passage with a second mating surface, fastening means for securing said first and second exhaust passage defining members with said first and second mating surfaces opposed to each other with sealing gasket means interposed therebetween, said gasket means including a pair of thin sheets placed in contact with said mating surfaces, respectively, and an intermediate layer being yieldable and located between said thin sheets, said intermediate layer containing a thermally expandable material which expands from an initial dimension upon first application of heat above a predetermined temperature range and shrinks when the heat is relieved to a second dimension which is greater than the initial dimension, said intermediate layer including fibers of a heat-resistant material, said thermally expandable material being dispersed in said fibers and said thermally expandable material includes mica.

2. An engine exhaust system in accordance with claim 1 in which the thermally expandable material includes vermiculite.

3. A fluid system for passing a high temperature liquid, said fluid system comprising connecting means between a first member defining a first fluid passage and a second member defining a second fluid passage, said first member having a first mating surface formed around an end of said first fluid passage, said second member having a second mating surface formed around an end of said second fluid passage, fastening means for fastening said first and second members with said first and second mating surfaces opposed with each other with gasket means interposed between said first and second mating surfaces so that said first and second fluid passages are connected with each other, gasket means including a pair of thin sheets placed in contact with said mating surfaces, respectively, and an intermediate layer being yieldable and located between said thin sheets, said intermediate layer containing fibers of a heat-resistant material and particles of vemiculite dispersed in the fibers, said vermiculite being expandable from an initial dimension upon first application of heat above a predetermined temperature range and shrinking when the heat is relieved to a second dimension which is greater than the initial dimension.

4. A gasket comprising a pair of thin sheets for providing outer sealing surfaces of the gasket and an intermediate layer being yieldable and located between said thin sheets, said layer containing mica which expands from an initial dimension upon first application of heat above a predetermined temperature range and which shrinks when the heat is relieved to a second dimension which is greater than the initial dimension.

5. An engine exhaust system in accordance with claim 1 in which said fibers of heat-resistance material are ceramic fibers.

6. An engine exhaust system in accordance with claim 1 in which said gasket means includes stopper means for preventing the intermediate layer from being compressed beyond a predetermined extent.

7. An engine exhaust system in accordance with claim 6 in which said stopper means includes insert means of a hard material placed between the mating surfaces in the vicinity of the fastening means.

8. An engine exhaust system in accordance with claim 7 in which the insert means is provided in the gasket means between the thin sheets.

9. A gasket in accordance with claim 4 which includes at least one bolt hole and an insert member of a hard material provided between said thin sheets at least around the bolt hole.

10. An engine exhaust system comprising a first exhaust passage defining member defining a first exhaust passage and formed at an end of said first exhaust passage with a first mating surface, a second exhaust passage defining member defining a second exhaust passage and formed at an end of said second exhaust passage with a second mating surface, fastening means for securing said first and second exhaust passage defining member with said first and second mating surfaces opposed to each other with sealing gasket means interposed therebetween, said gasket means including a pair of thin sheets placed in contact with said mating surfaces, respectively, and an intermediate layer being yieldable and located between said thin sheets, said intermediate layer containing fibers of heat-resistant material and particles of mica dispersed in the fibers, said mica expanding from an initial dimension upon first application of heat above a predetermined temperature range and which shrinks when the heat is relieved to a second dimension which is greater than the initial dimension.

11. An engine exhaust system in accordance with claim 10, wherein said fibers of said heat resistant material in said gasket means are ceramic fibers, said gasket means including stopper means for preventing said intermediate layer in the gasket means from being compressed in a thickness wise direction beyond a predetermined value, said gasket means further including cover means around peripheries of said intermediate layer for preventing swelling out of the intermediate layer from peripheries of said thin sheets.

12. An engine exhaust system in accordance with claim 10, wherein said particles of mica are contained in vermiculite.

13. An engine exhaust system comprising a first exhaust passage defining member defining a first exhaust passage and formed at an end of said first exhaust passage with a first mating surface, a second exhaust passage defining member defining a second exhaust passage and formed at an end of said second exhaust passage with a second mating surface, fastening means for securing said first and second exhaust passage defining member with said first and second mating surfaces opposed to each other with sealing gasket means interposed therebetween, said gasket means including a pair of thin sheets placed in contact with said mating surfaces, respectively, and an intermediate layer being yieldable and located between said thin sheet, at least one bolt hole formed through said thin sheets and said intermediate layer, insert means of a hard material provided between said thin sheets around said bolt hole, said intermediate layer containing ceramic fibers and particles of mica dispersed in said fibers, said mica expanding from an initial dimension upon first application of heat above a predetermined temperature range and which shrinks when the heat is relieved to a second dimension which is greater than the initial dimension, and peripheral means for covering peripheral portions of said intermediate layer so that the intermediate layer prevents swelling out from peripheral portions of the thin sheets.

14. A method of providing an engine exhaust system comprising the steps of providing gasket means formed with gas passage means and including a pair of thin sheets and an intermediate layer between said thin sheets, said intermediate layer containing fibers of a heat resistant material and particles of mica dispersed in said fibers, said mica expanding from an initial dimension upon first application of heat above a predetermined temperature range and shrinking when the heat is relieved to a second dimension which is greater than the initial dimension, locating said gasket means between mating surfaces of a first and second exhaust passage defining members so that exhaust passages in said first and second exhaust passage defining members are communicated with each other through said gas passage means in said gasket means, fastening said first and second exhaust passage defining member with said mating surfaces opposed to each other with said sealing gasket means interposed therebetween, heating the gasket means and the first and second exhaust passage defining members at least in the vicinity of said gasket means so that the particles of mica are thermally expanded, cooling the gasket means so that the particles of mica are shrunk to a dimension greater than an initial dimension so that said intermediate layer in said gasket means is increased in thickness greater than a thickness before the heating.

* * * * *